US007191689B2

(12) United States Patent
Clark

(10) Patent No.: US 7,191,689 B2
(45) Date of Patent: Mar. 20, 2007

(54) HOLLOWING SYSTEM

(75) Inventor: Keith Clark, Oklahoma City, OK (US)

(73) Assignee: TSDr, L.L.C., Oklahoma City, OK (US)

(*) Notice: Subject to any disclaimer, the term of this patent is extended or adjusted under 35 U.S.C. 154(b) by 0 days.

(21) Appl. No.: 10/800,064

(22) Filed: Mar. 12, 2004

(65) Prior Publication Data

US 2004/0244547 A1 Dec. 9, 2004

Related U.S. Application Data

(60) Provisional application No. 60/455,099, filed on Mar. 14, 2003.

(51) Int. Cl.
*B27C 7/06* (2006.01)
*B23B 3/02* (2006.01)

(52) U.S. Cl. .......................... 82/1.11; 82/158; 142/49

(58) Field of Classification Search ................ 82/1.11, 82/158; 142/48, 49, 56, 55
See application file for complete search history.

(56) References Cited

U.S. PATENT DOCUMENTS 476,696 A 6/1892 Stoner et al.
950,329 A * 2/1910 Hillenbrand ................ 82/161
1,860,376 A * 5/1932 Ames .......................... 142/48
2,919,727 A 1/1960 Brewer, Jr.
3,981,211 A * 9/1976 Turner ......................... 82/158
4,063,577 A 12/1977 Tennant
4,995,434 A * 2/1991 Christiansen ................ 142/48
5,224,529 A 7/1993 Kenny
5,441,089 A 8/1995 Lazarou
5,503,200 A * 4/1996 Lea ............................ 142/38
5,597,023 A * 1/1997 Heintzeman ............ 144/204.2
5,839,333 A 11/1998 McKay
5,992,482 A * 11/1999 Voisey ........................ 142/49
D481,604 S * 11/2003 Woodruff ..................... D8/71

OTHER PUBLICATIONS

"The Kel McNaughton Hollowing Rig", Kelton Industries, Ltd., website: http://www.kelton.co.nz/rig.html, pp 1-3.
"Shop Built Hollowing Rig with Laser for Mini Lathe", by Al Crandall; WoodCentral Articles & Reviews; website: http://woodcentral.com/egi-bin/readarticle.pl?dir=turning &file=articles_499.shtml. pp. 1-3.

* cited by examiner

*Primary Examiner*—Monica Carter
*Assistant Examiner*—Sara Addisu
(74) *Attorney, Agent, or Firm*—Dunlap, Codding & Rogers, P.C.

(57) ABSTRACT

A hollowing system for a lathe having a tool rest. The hollowing system comprises a boring member, and a stabilization assembly. The boring member is adapted to support a tool such that at least one of the boring member and the tool extend past and engage the tool rest. The stabilization assembly is mountable adjacent to the lathe. The stabilization assembly supports the boring member such that the boring member extends generally parallel to a longitudinal axis of the lathe. The stabilization assembly has a vertical axis and a horizontal axis. The stabilization assembly is adapted to prevent downward movement of the tool when the stabilization assembly is mounted adjacent to the lathe and the tool is positioned on the tool rest. The stabilization assembly is provided with an articulation assembly. The articulation assembly supports the boring member and permits horizontal movement of the boring member about the vertical axis, while also permitting lateral movement of the boring member in a horizontal direction.

15 Claims, 3 Drawing Sheets

HOLLOWING SYSTEM

CROSS REFERENCE TO RELATED APPLICATIONS

The present patent application claims priority to the provisional patent application filed on Mar. 14, 2003, U.S. Ser. No. 60/455,099, the entire content of which is hereby incorporated herein by reference.

STATEMENT REGARDING FEDERALLY SPONSORED RESEARCH AND DEVELOPMENT

Not Applicable.

BACKGROUND OF THE INVENTION

The present invention relates to an aid to be used by a wood turner to ease the process of creating hollowed vessels on a wood turning lathe. Wood turning lathes have been used for creating hollowed vessels for many years. Typically, a wood turner mounts a log or other medium onto a lathe and then uses a handheld cutting tool to remove the solid wood from inside the log while leaving an outer rim that forms the walls of the vessel.

Usually, a tool rest is placed next to the endgrain of the log and the handheld tool is advanced into the end grain of the log to hollow the wood. This process is difficult for several reasons. First, there are forces placed on the tool that tend to push the tip of the tool downward as well as rotate the tool around its long axis. As long as the tool tip is close to the tool rest, the forces are minimized. However, as the log is hollowed, the tool tip moves farther from the tool rest. The tool rest acts as a fulcrum and much more force is needed to control the tool tip. This becomes more pronounced as the depth of the vessel increases.

The present invention is directed to a hollowing system that controls the tool movements along certain axes while allowing full movement along other axes. Thus, the tool can be advanced or retracted to shape the inside of the vessel without having to fight the significant forces being generated. This results in much easier, faster and safer removal of the solid wood to form the vessel.

DETAILED DESCRIPTION OF THE INVENTION

Figure 1:
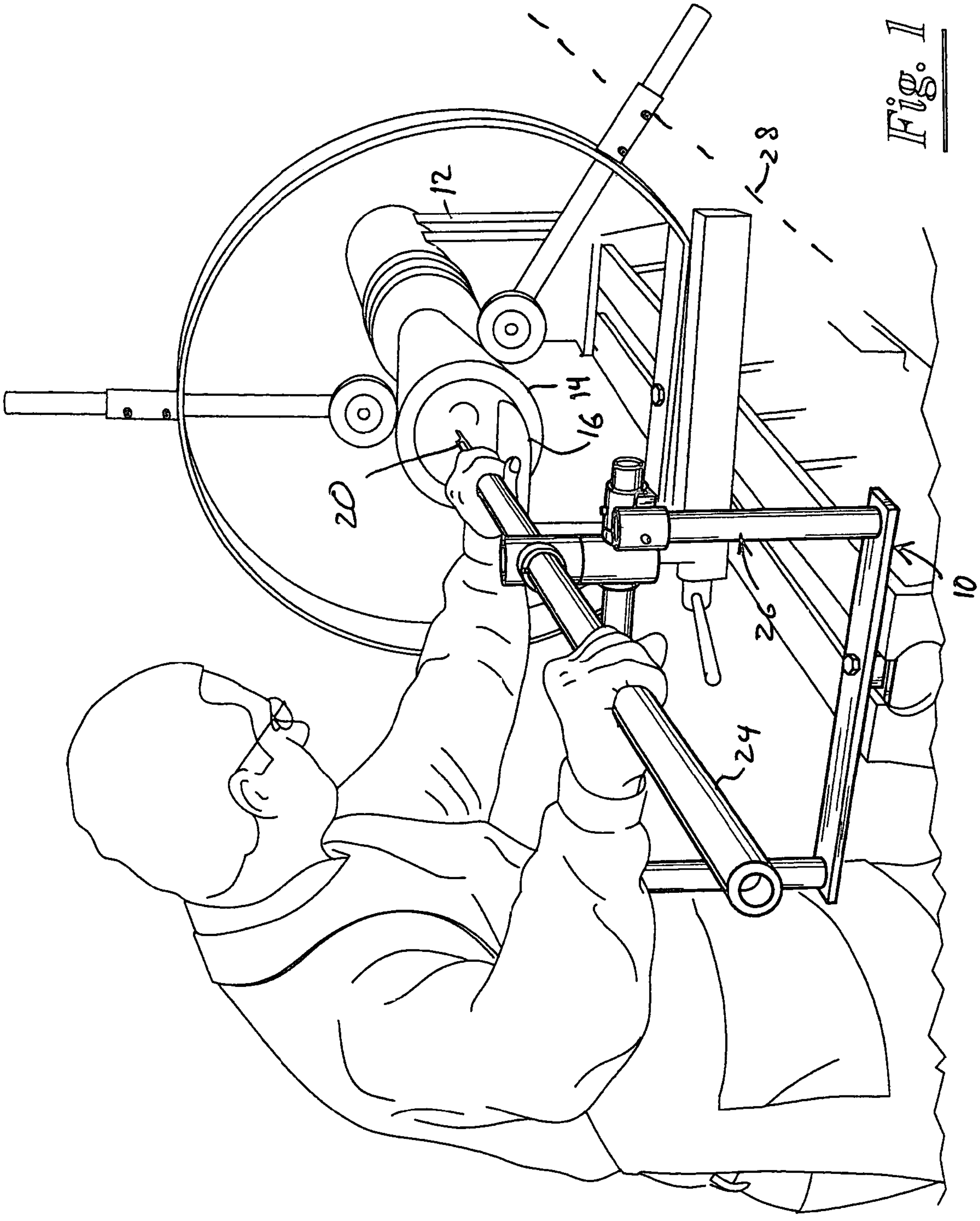
FIG. 1 is a perspective view illustrating a wood turner utilizing a hollowing system constructed in accordance with the present invention to form a vessel from a log.

Referring now to the drawings, and more particularly to FIG. 1, shown therein and designated by a reference numeral 10, is a hollowing system constructed in accordance with the present invention. The hollowing system 10 is mounted either on or adjacent to a lathe 12. A workpiece 14, such as a log, is mounted to and supported by the lathe 12 in a well-known manner. The lathe 12 also includes a tool rest 16, which is positioned generally between the workpiece 14 and the hollowing system 10 to support a tool 20 used for removing wood or other material from the workpiece 14.

The tool 20 can be any type of cutter for removing wood or other materials from the workpiece 14. For example, the tool 20 can be a cutting tool such as a gouge, parting tool, skew chisel, round nose chisel, spear point chisel or scraper.

The hollowing system 10 is provided with a boring member 24, and a stabilization assembly 26. The boring member 24 supports the tool 20. The boring member 24 can be constructed of a unitary chrome-hardened tube, or a plurality of interconnectable pieces so that the length of the boring member 24 can be increased or decreased. The tool 20 can be connected to the boring member 24 via any suitable manner, such as by positioning a portion of the tool 20 within the boring member 24 and securing the tool 20 therein with a set screw.

The stabilization assembly 26 is mountable on or adjacent to the lathe 12 and supports the boring member 24 such that the boring member 24 extends generally parallel to a longitudinal axis 28 of the lathe 12.

Figure 2:
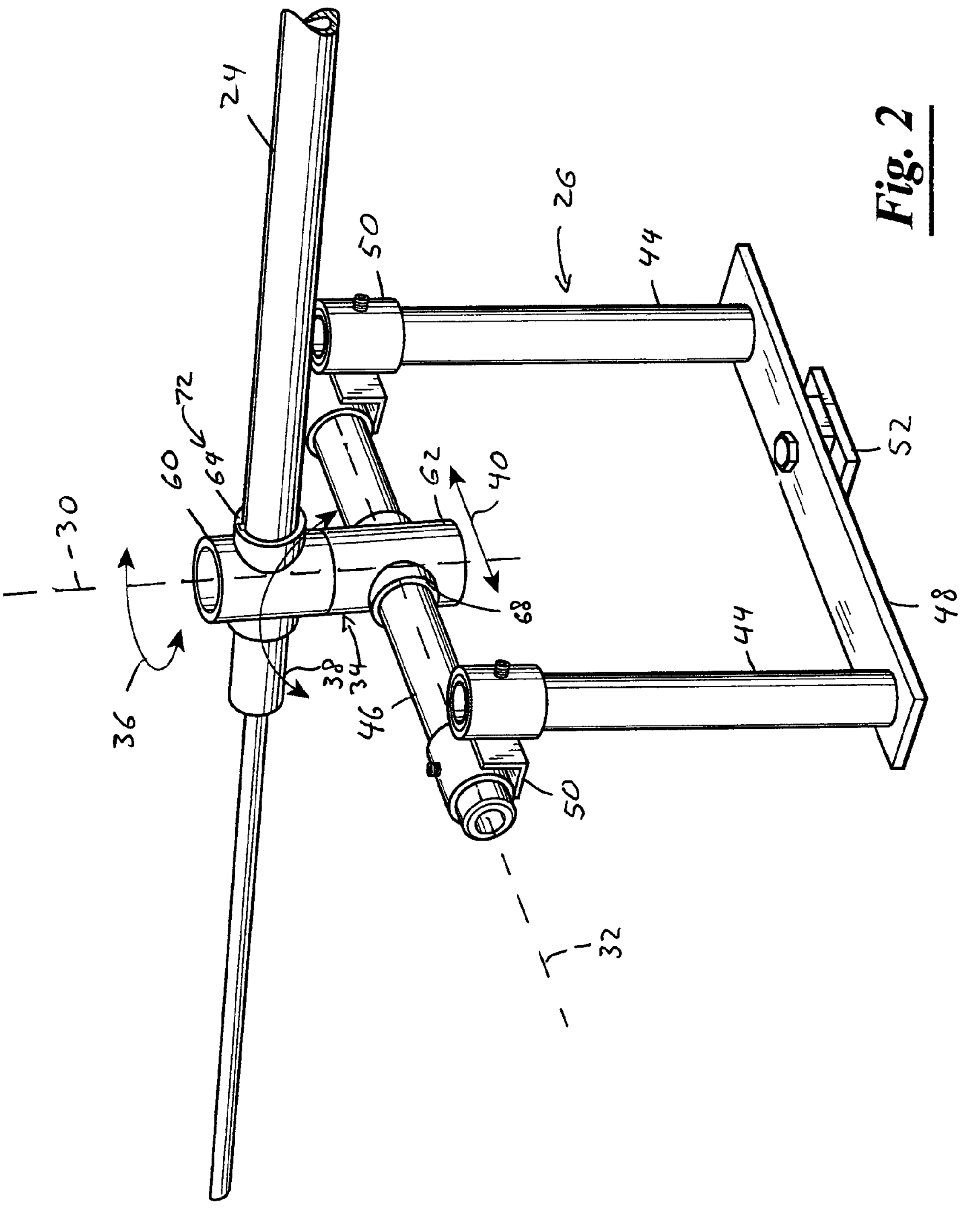
FIG. 2 is a perspective view of the hollowing system depicted in FIG. 1.

As shown in FIG. 2, the stabilization assembly 26 includes a vertical axis 30, and a horizontal axis 32. The stabilization assembly 26 includes an articulation assembly 34. The articulation assembly 34 permits horizontal movement of the boring member 24 about the vertical axis 30 (as indicated by an arrow 36) and vertical movement about the horizontal axis 32 (as indicated by an arrow 38) while also permitting lateral movement of the boring member 24 in a horizontal direction (as indicated by an arrow 40).

The stabilization assembly 26 is also provided with at least one vertical support 44, at least one horizontal support 46, and a base plate 48. As best shown in FIG. 2, in one preferred embodiment the stabilization assembly 26 is provided with two spatially disposed vertical supports 44 which support the horizontal support 46 via a pair of couplers 50. The vertical supports 44 are rigidly connected to the base plate 48 via any suitable manner, such as a weld or a bolt. The base plate 48, vertical support 44 and horizontal support 46 are preferably constructed of rigid materials, such as steel. The stabilization assembly 26 also includes a clamping member 52 supported by the base plate 48 for permitting the stabilization assembly 26 to be rigidly connected to the lathe 12 (FIG. 1). Although the stabilization assembly 26 has been described as having the clamping member 52 for mounting to the lathe 12, it should be understood that the stabilization assembly 26 can be mounted to the lathe 12 via any suitable manner, such as a weld, a clamp, bolts, screws, or the like. The stabilization assembly 26 can also be mounted to a stand, ceiling or other device positioned adjacent to the lathe 12.

The articulation assembly 34 is provided with a first housing 60, and a second housing 62. The first housing 60 is pivotally or rotatably mounted to the second housing 62 so that the first housing 60 can be rotated in the direction 36 about the vertical axis 30. The first housing 60 is provided with a sleeve 64 forming a bore to receive the boring member 24. The sleeve 64 permits the boring member 24 to freely reciprocate through the sleeve 64, or in other words, to slide in and out of the sleeve 64 during hollowing. The sleeve 64 is preferably chrome-hardened internally and fitted very closely to the outer dimension of the boring member 24, although other manners can be used to permit the boring member 24 to reciprocate. For example, the sleeve 64 can be provided with one or more ball bearings and/or a track to permit the boring member 24 to reciprocate. The sleeve 64 can be formed integrally with the first housing 60, or be provided as a separate piece. When the sleeve 64 is a separate piece, the sleeve 64 is secured in the first housing 60 via any suitable manner, such as a set screw or weld.

The second housing 62 is provided with a sleeve 68 forming a bore to receive the horizontal support 46. The sleeve 68 permits the second housing 62 to move or rotate about the horizontal axis 32 (as indicated by the arrow 38) while also permitting lateral movement of the boring member 24 in a horizontal direction (as indicated by an arrow 40). The horizontal support 46 is preferably mounted at a right angle to the longitudinal axis 28 (FIG. 1) of the lathe 12 so that the second housing 62, and thus, the first housing 60, moves at a right angle to the longitudinal axis 28 of the lathe 12. The horizontal support 46 freely reciprocates through the sleeve 68 or, in other words, slides across the horizontal support 46 during hollowing. The sleeve 68 is preferably chrome-hardened internally and fitted very closely to the outer dimension of the horizontal support 46, although other manners can be used to permit the second housing 62 to move on the horizontal support 46. For example, the sleeve 68 can be provided with one or more ball bearings. The sleeve 68 can be secured in the second housing 62 via a set screw or weld.

In one preferred embodiment, the second housing 62 includes a ring extending into the first housing 60. The first housing 60 is secured on the second housing 62 with a hidden screw and nut (not shown). With the tool 20 or the boring member 24 supported by the tool rest 16, the second housing 62 can rotate around the horizontal axis 32 only when the height of the horizontal support 46 is changed. The first housing 60 can rotate around the vertical axis 30 and the second housing 62 can move laterally on the horizontal support 46 when hollowing.

The hollowing system 10 can be mounted on a wide variety of lathes 12 and is adjusted by setting the height of the horizontal support 46 to place the tool 20 supported by the boring member 24 a desired angle near horizontal. One skilled in the art will understand that the tool 20 does not always have to be supported at an exact horizontal angle to function properly. Thus, the term "near horizontal," as used herein, refers to an angle where the tool 20 cuts properly or efficiently on the workpiece 14. The exact angle will depend on the type of workpiece 14, as well as the type and/or shape of the tool 20.

Figure 3:
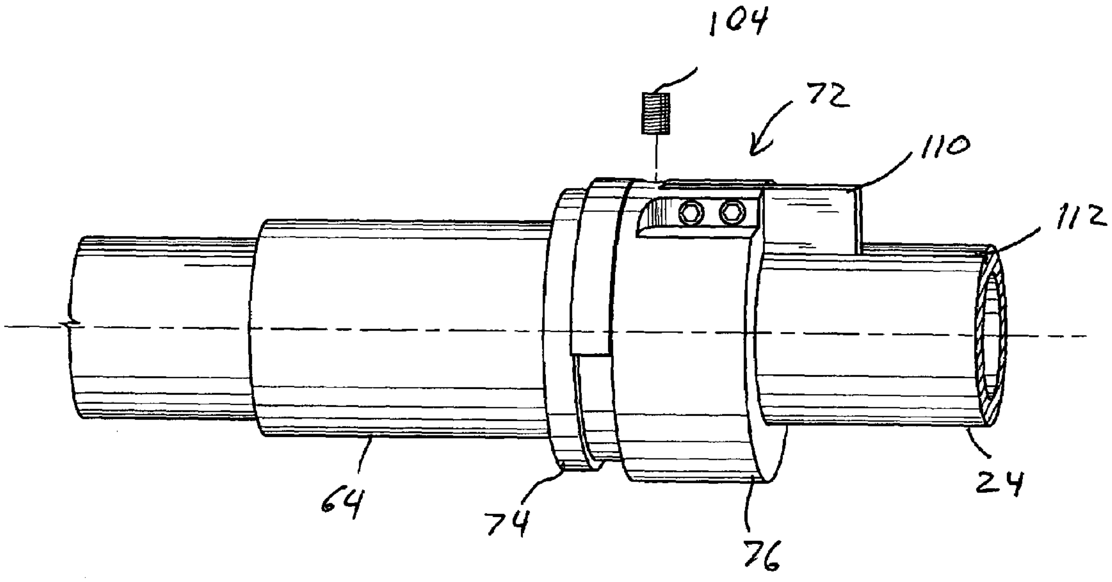
FIG. 3 is a perspective view of a rotational prevention assembly constructed in accordance with the present invention.
Figure 4:
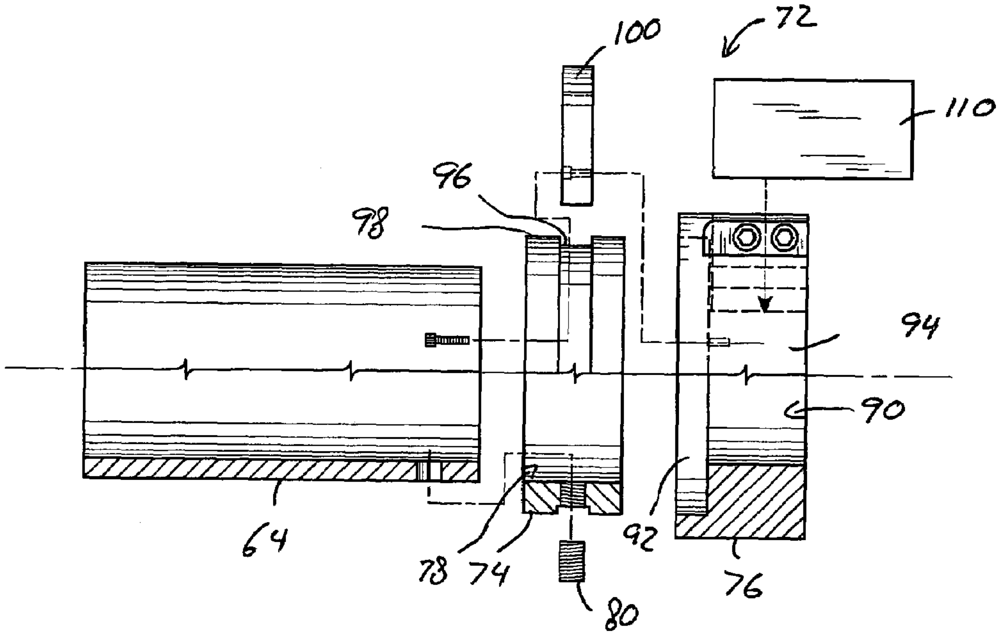
FIG. 4 is an exploded cross-sectional view of the rotational prevention assembly depicted in FIG. 3.

As an optional feature, as shown in FIGS. 3 and 4, a rotational prevention assembly 72 can be associated with the first housing 60 to prevent rotational movement of the boring member 24. In a preferred embodiment, the rotational prevention assembly 72 includes a first fitting 74 connected to the sleeve 64, and a second fitting 76 rotatably mounted to the first fitting 74. In one preferred embodiment, the first and second fittings 74 and 76 have a cylindrical shape.

The first fitting 74 defines a bore 78. The sleeve 64 is positioned in the bore 78 of the first fitting 74. The sleeve 64 is secured within the bore 78 by any suitable manner, such as a set screw 80, or a weld.

The second fitting 76 also defines a bore 90. The bore 90 is provided with a first portion 92 and a second portion 94. The first portion 92 of the bore 90 is sized to matingly receive the first fitting 74. The second portion 94 of the bore 90 is sized to matingly receive the boring member 24. To secure the first fitting 74 to the second fitting 76 while also permitting rotation therebetween, the first fitting 74 is provided with a groove 96 extending about at least a portion of an outer peripheral surface 98 of the first fitting 74.

A connector 100 is positioned in the groove 96 and the connector 100 is secured to the second fitting 76 such that the connector 100 can slide about the first fitting 74 in the groove 96. The connector 100 can be secured to the second fitting by any suitable method, such as welds, glues, screws, epoxies, keys or the like. Rotation between the first fitting 74 and the second fitting 76 is permitted or prevented by a stop assembly 104. The stop assembly 104 can be any suitable mechanical assembly, such as a set crew, a toggle clamp, or the like.

A key 110 is mounted to the second fitting 76, and an elongated slot 112 is formed in the boring member 24. The key 110 is positioned in the slot 112 and engages the boring member 24 to prevent rotation of the boring member 24.

This design allows three options. With the key 110 in place and the stop assembly 104 set to prevent rotation between the first and second cylindrical fittings 74 and 76, the boring member 24 cannot rotate about its long axis. When the key 110 is removed or the stop assembly is set to permit rotation between the first and second cylindrical fittings 74 and 76, full rotation is allowed, which is necessary when certain tools 20, such as a hook tool, are used because the tool 20 is rotated as the tool 20 is brought from deep inside the workpiece 14. The third option allows the boring member 24 to be rotated to any position through 360 degrees and then locked into place by adjusting the stop assembly 104 and then rotating the first and second fittings' 74 and 76 relative to one another and then adjusting the stop assembly 104. This allows further flexibility in tool selection. The third option also allows the user to position the slot 112 where desired.

One skilled in the art will recognize that the hollowing system 10 will be sold to the wood turner and then installed onto or adjacent to the lathe 12. In use, the base plate 48 and the workpiece 14 are mounted to the lathe 12. The tool rest 16 is then positioned between the hollowing system 10 and the workpiece 14 and locked into place. The height of the tool rest 16 is then adjusted to a desired position, and the height of the horizontal support 46 is adjusted such that the tool 20 is supported by the tool rest 16 at the near horizontal angle. The lathe 12 is then actuated to spin the workpiece 14. The workpiece 14 is then shaped in a well-known manner by advancing the tool 20 into and/or out of the workpiece 14. The stabilization assembly 26 resists the forces created between the workpiece 14 and the tool 20 so that the user is not having to fight these significant forces.

While presently preferred embodiments of the present invention have been described herein, one skilled in the art will recognize that many changes or alterations can be made to the preferred embodiments without departing from the spirit and scope of the present invention. It is, therefore, intended that all such modifications, alterations and other changes be encompassed by the claims.

What is claimed is:

1. A hollowing system for a lathe having a tool rest, the hollowing system comprising:

a boring member adapted to support a tool such that at least one of the boring member and the tool extend past and engage the tool rest, the boring member having a longitudinal axis; and a stabilization assembly mountable adjacent to the lathe, the stabilization assembly supporting the boring member so that the boring member can reciprocate along its longitudinal axis, the stabilization assembly having a vertical axis and a horizontal axis, the stabilization assembly adapted to prevent downward movement of the tool when the stabilization assembly is mounted adjacent to the lathe and the tool is extended past and supported by the tool rest causing downward forces to be applied to the tool when the tool engages a workpiece, the stabilization assembly comprising:

an articulation assembly supporting the boring member while permitting lateral movement of the boring member in a horizontal direction while the tool is being used for hollowing;

a rotational prevention assembly engaging the articulation assembly and the boring member to selectively permit and prevent rotation of the boring member about the longitudinal axis of the boring member.

2. The hollowing system of claim 1, wherein the stabilization assembly further comprises a horizontal support and also wherein the articulation assembly comprises:

a first housing supporting the boring member; and a second housing pivotally mounted to the first housing, the second housing mounted on the horizontal support to permit the lateral movement of the boring member.

3. The hollowing system of claim 1, wherein the rotation prevention assembly comprises:

a first fitting connected to at least a portion of the articulation assembly;

a second fitting rotatably mounted to the first fitting; and means for selectively preventing rotation of the second fitting relative to the first fitting.

4. The hollowing system of claim 3, wherein each of the first and second fittings cooperate to define a bore receiving at least a portion of the boring member.

5. The hollowing system of claim 3, wherein the first and second fittings have a cylindrical shape.

6. The hollowing system of claim 3, wherein the means for selectively preventing rotation includes a set screw.

7. The hollowing system of claim 3, wherein the means for selectively preventing rotation includes a toggle clamp.

8. A hollowing system for a lathe having a tool rest, the hollowing system comprising:

a boring member adapted to support a tool such that at least one of the boring member and the tool extend past and engage the tool rest, the boring member having a longitudinal axis; and a stabilization assembly mountable adjacent to the lathe, the stabilization assembly supporting the boring member so that the boring member can reciprocate along its longitudinal axis, the stabilization assembly having a vertical axis and a horizontal axis, the stabilization assembly adapted to prevent downward movement of the tool when the stabilization assembly is mounted adjacent to the lathe and the tool is extended past and supported by the tool rest causing downward forces to be applied to the tool when the tool engages a workpiece, the stabilization assembly comprising:

a horizontal support; and an articulation assembly comprising:

a first housing supporting the boring member; and a second housing pivotally mounted to the first housing, the second housing mounted on the horizontal support to permit lateral movement of the boring member while the tool is being used for hollowing.

9. The hollowing system of claim 8 further comprising a rotation prevention assembly engaging the articulation assembly and the boring member to prevent rotation of the boring member about a longitudinal axis of the boring member.

10. The hollowing system of claim 9, wherein the rotation prevention assembly includes means for selectively permitting rotation of the boring member about the longitudinal axis of the boring member.

11. The hollowing system of claim 9, wherein the rotation prevention assembly comprises:

a first fitting connected to at least a portion of the articulation assembly;

a second fitting rotatably mounted to the first fitting; and means for selectively preventing rotation of the second fitting relative to the first fitting.

12. The hollowing system of claim 11, wherein each of the first and second fittings cooperate to define a bore receiving at least a portion of the boring member.

13. The hollowing system of claim 11, wherein the first and second fittings have a cylindrical shape.

14. The hollowing system of claim 11, wherein the means for selectively preventing rotation includes a set screw.

15. The hollowing system of claim 11, wherein the means for selectively preventing rotation includes a toggle clamp.

* * * * *

UNITED STATES PATENT AND TRADEMARK OFFICE

CERTIFICATE OF CORRECTION

PATENT NO. : 7,191,689 B2
APPLICATION NO. : 10/800064
DATED : March 20, 2007
INVENTOR(S) : Keith Clark It is certified that error appears in the above-identified patent and that said Letters Patent is hereby corrected as shown below:

Column 4, line 9: Delete “crew” and replace with -- screw --.

Signed and Sealed this

Twenty-fourth Day of July, 2007

JON W. DUDAS
*Director of the United States Patent and Trademark Office*